(12) United States Patent
    Pigatti

(10) Patent No.: US 9,759,372 B2
(45) Date of Patent: Sep. 12, 2017

(54) TABLET COMPUTER SUPPORT

(71) Applicant: SILCA S.P.A., Vittorio Veneto (IT)

(72) Inventor: Giorgio Pigatti, Vittorio Veneto (IT)

( * ) Notice: Subject to any disclaimer, the term of this patent is extended or adjusted under 35 U.S.C. 154(b) by 0 days.

(21) Appl. No.: 15/111,134

(22) PCT Filed: Jan. 26, 2015

(86) PCT No.: PCT/IB2015/050557
§ 371 (c)(1),
(2) Date: Jul. 12, 2016

(87) PCT Pub. No.: WO2015/114499
PCT Pub. Date: Aug. 6, 2015

(65) Prior Publication Data
US 2016/0341355 A1    Nov. 24, 2016

(30) Foreign Application Priority Data
Jan. 28, 2014   (IT) .............................. VE2014A0006

(51) Int. Cl.
*F16M 13/00*   (2006.01)
*F16M 13/02*   (2006.01)
(Continued)

(52) U.S. Cl.
CPC .............. *F16M 13/02* (2013.01); *B23C 3/35* (2013.01); *F16M 11/041* (2013.01);
(Continued)

(58) Field of Classification Search
CPC ...... F16M 11/10; F16M 13/00; F16M 11/041; F16M 2200/024; F16M 11/38;
(Continued)

(56) References Cited

U.S. PATENT DOCUMENTS 5,100,098 A    3/1992   Hawkins
5,915,661 A *  6/1999   Silverman .............. F16M 11/10
                                                        248/454

(Continued)

FOREIGN PATENT DOCUMENTS

GB       2423468       8/2006
WO    2012155047      11/2012

*Primary Examiner* — Steven Marsh
(74) *Attorney, Agent, or Firm* — Themis Law

(57) ABSTRACT

A support for a tablet computer includes a base shaped to stably rest both on flat and on curved surfaces, a mechanical system for removably fixing the base securely to a key processing machine to be connected to and controlled by the tablet, a tubular element fixed on the upper surface of the base, a cylindrical member housed in the interior of the tubular element and rotatable relative thereto, first members for resting on and coupling to the lower transverse edge of the tablet and second members for resting on and coupling to the upper transverse edge of the tablet, wherein the first members and the second members are disposed at an angle to each other and are associated with the cylindrical member to rotate therewith relative to the tubular element, the relative distance between said the resting and coupling members and the second resting and coupling members being adjustable.

19 Claims, 2 Drawing Sheets

Figure 1:
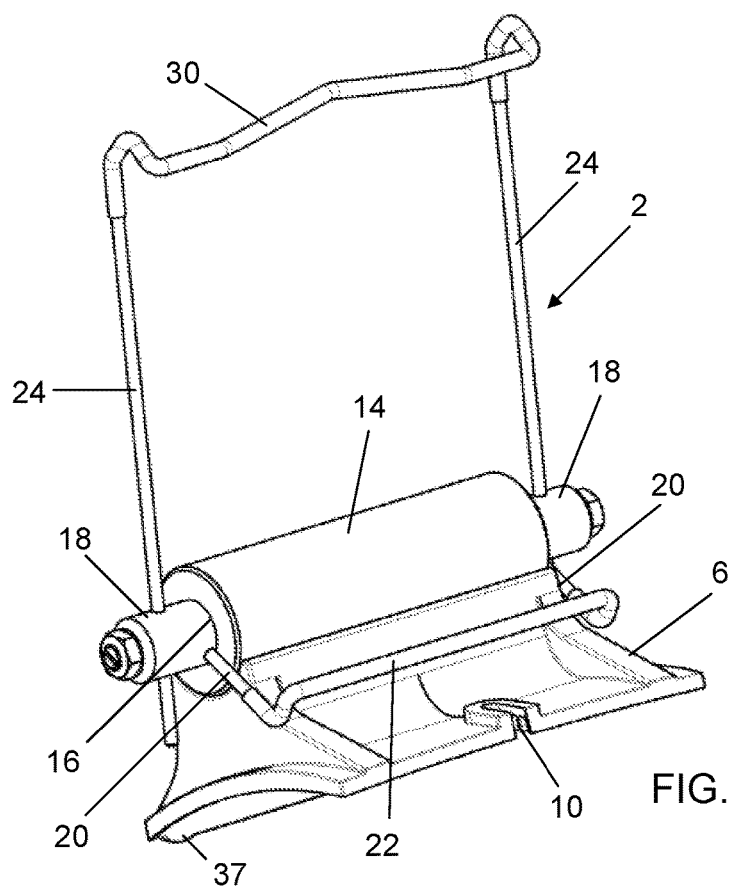

(51) Int. Cl.
  *F16M 11/04* (2006.01)
  *F16M 11/10* (2006.01)
  *B23C 3/35* (2006.01)
  *G06F 1/16* (2006.01)

(52) U.S. Cl.
  CPC ............ F16M 11/10 (2013.01); F16M 13/00 (2013.01); F16M 13/022 (2013.01); G06F 1/1626 (2013.01); *B23C 2235/12* (2013.01); *F16M 2200/022* (2013.01); *F16M 2200/041* (2013.01); *F16M 2200/08* (2013.01)

(58) Field of Classification Search
  CPC .. F16M 2200/08; F16M 13/02; F16M 13/022; F16M 2200/041; F16M 11/105; F16M 11/2021; F16M 13/005; F16M 11/2014; F16M 11/24
  USPC ............. 248/371, 446, 447, 454, 465.1
  See application file for complete search history.

(56) References Cited

U.S. PATENT DOCUMENTS

| | | | |
|---|---|---|---|
| 5,918,907 A * | 7/1999 | Ho | B42D 17/00 248/441.1 |
| 2002/0053629 A1* | 5/2002 | Hokugoh | F16M 11/10 248/371 |
| 2003/0183738 A1* | 10/2003 | Weingartner | A47B 23/042 248/453 |
| 2004/0173725 A1* | 9/2004 | Rodriguez Villanueva | A47B 23/042 248/454 |
| 2005/0121594 A1* | 6/2005 | Kuo | F16M 11/10 248/676 |

* cited by examiner

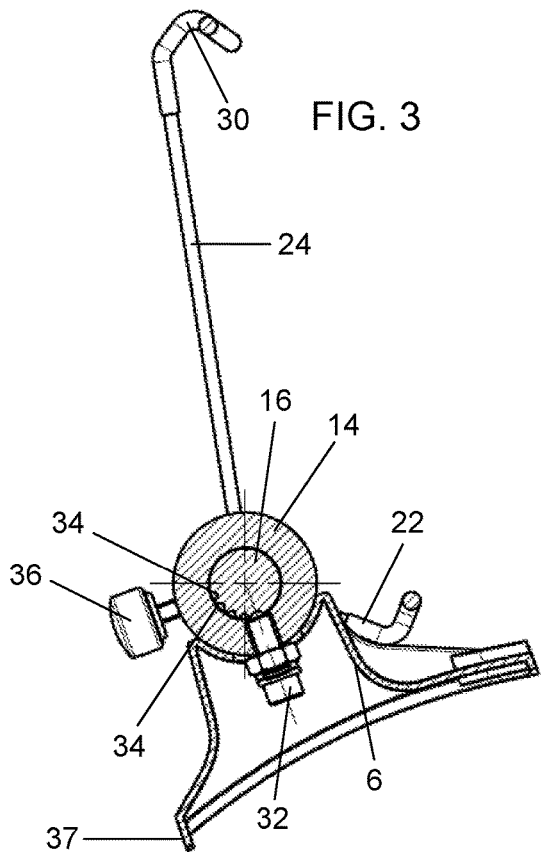
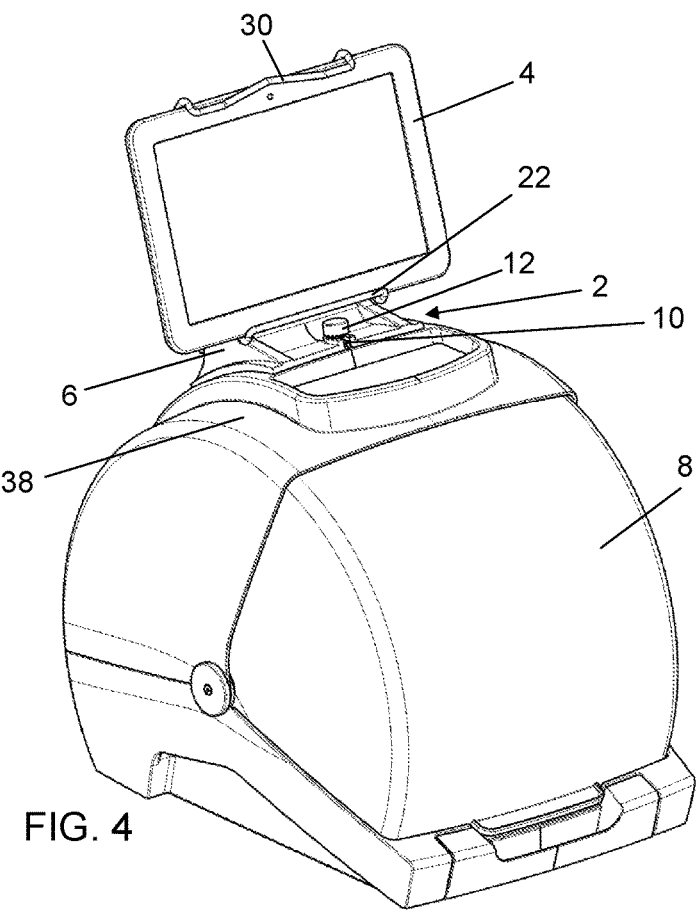

TABLET COMPUTER SUPPORT

The present invention relates to a tablet computer support.

Hereinafter a "tablet computer" or simply "tablet" means a portable computer configured as a "tablet" and provided with a touch-screen display which forms substantially the only input system available to the user.

Tablet holders are known which, besides enabling the tablet to be covered, can be suitably folded in such a manner as to support the tablet in a position slightly inclined rearward to the vertical.

Tablet supports are also known consisting of a series of hooks which support the tablet, and of one or more arms intended to be fixed, by traditional mechanical means (magnets, suckers, brackets, etc.) to different surfaces, such as a table top, or the dashboard or windscreen of an automobile, etc.

However, these known supports are not completely satisfactory and, in particular, cannot be easily and securely associated with machines which require the use of a tablet, such as in particular processing machines for keys (bitting, shank grooving, incision, etc.).

In greater detail, the key characteristics are usually memorized in a database, which must be suitably consulted at the moment of processing the key. To achieve this consultation effectively, it is usual to use a tablet which can be easily connected by a traditional cable to a USB port provided on the machine and used for updating the database and the machine operating software.

However, currently none of the supports of known type has proved suitable for mounting on and/or be used in combination with a key processing machine, in particular when subjected to vibrations produced by tools incorporated therein (milling cutter, punch, etc.).

Moreover, the known supports are normally usable for a single type of tablet with well defined dimensions, and cannot therefore be used for supporting tablets of different shape and dimensions, in particular considering that tablets are currently available with displays with dimensions varying from 6 to 10 inches, and even reaching 20 inches in the case of maxi-tablets.

Another fact is that some of these known supports are of particularly complicated construction, and therefore costly and of poor reliability.

GB2423468 describes a rotary support usable for notebooks, but not for tablets. In greater detail, this support presents a circular base able to be rested exclusively on a flat surface, hence said support is not suitable for use in combination with a key processing machine, which generally has a curved body. Moreover the fact that the seat for housing the notebook is defined only by two rods provided lowerly with a hooked section, means that it is not suitable for adequately and securely supporting a tablet (which is substantially lighter than a notebook), in particularly when the considerable vibrations produced by key processing machines are present.

WO 2012/155047 describes a tablet support for its mounting on a glass wall such that it can be seen through the glass wall itself. In particular, this support is suitable only for supporting the tablet such as to maintain it resting on and parallel to a flat wall. Moreover, this support is fairly complicated constructionally as it comprises the present of a first joint for hinging a pair of arms about the support base, to enable the tablet to be rotated towards and away from the flat glass wall, and a second hinging joint for rotating the tablet through at least 180° about said pair of arms. In addition, in this support, the base has to be provided with a socket for recharging the tablet, which means that suitable passages must be provided inside the base for the electric feed cables.

U.S. Pat. No. 5,100,098 describes a support and protection structure for a tablet. In particular, this structure comprises two equal flat portions, hinged together by a pin which acts as a handle; the rear of the tablet adheres totally to one of the two flat portions, and is fixed thereto by snap-engagement means. In greater detail, two operative configurations of the structure are provided: one closed for transportation, in which the two flat portions are closed about the tablet in such a manner as to protect it; and one open for use of the tablet, in which the portion not engaged with the tablet lies at an angle to the other and is rested on a flat surface such as to define a support base. This structure is not suitable for being removably applied to a key processing machine, and moreover can be used only with tablets with dimensions equal to those of said turnable flat portions.

An object of the invention is to propose a support which is specific for a tablet computer and can be fixed easily and securely to different machines, in particular to key processing machines.

Another object of the invention is to propose a support adaptable to tablet computers of different dimensions.

Another object of the invention is to propose a support for tablet computers which is of simple construction, of rapid and reliable use, and of low cost.

All these objects and others which will be apparent from the ensuing description are attained according to the invention by a tablet computer support with the characteristics indicated in claim 1, and by a key processing machine with the characteristics indicated in claim 18.

Figure 2:
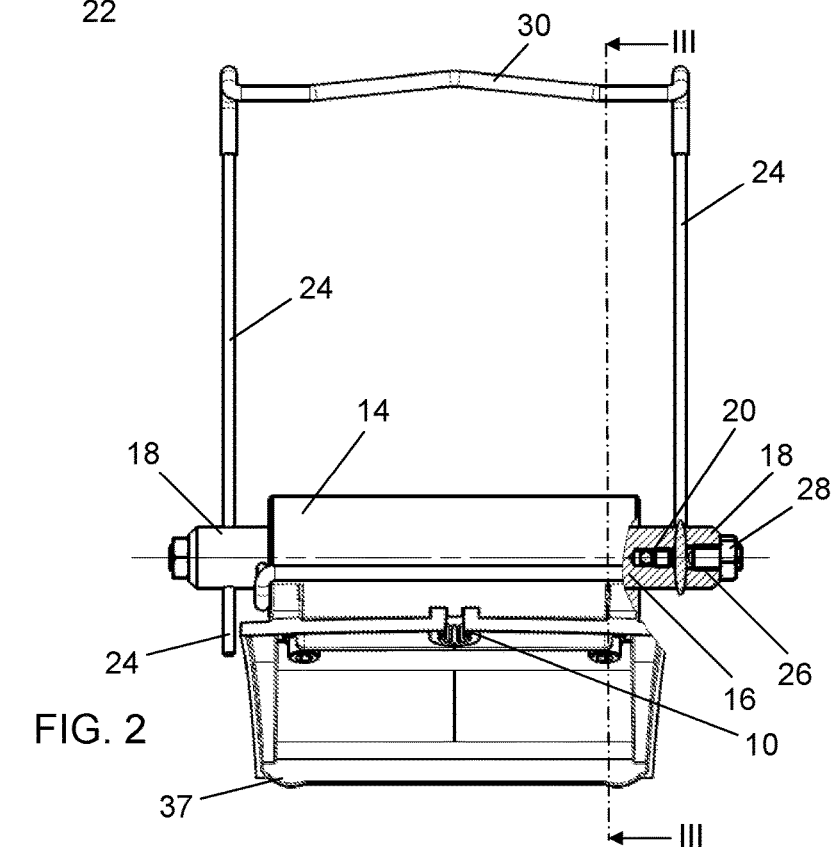

A preferred embodiment of the present invention is described hereinafter with reference to the accompanying drawings, in which:

FIG. 1 is a perspective view of a tablet computer support according to the invention FIG. 2 is a partly sectional view thereof seen from below, FIG. 3 shows a section therethrough taken on the line III-III of FIG. 2, FIG. 4 shows a perspective view thereof provided with a tablet and applied to a key processing machine.

As can be seen from the figures, the support 2 according to the invention for a tablet computer 4 comprises an internally hollow base 6 lowerly curved downwards, to enable said support to be securely rested both on perfectly flat and on slightly curved surfaces.

Preferably, the bottom (i.e. the lower surface) of the base 6 is of substantially rectangular plan, with two rectilinear parallel transverse sides and with its other two sides slightly curved. In greater detail, the bottom of the base 6 consists of a cylindrical surface portion which has a curvature suitably corresponding to that of the outer surface of the casing of the machine 8 to which the support is to be applied. This configuration enables stable resting with the two rectilinear sides on a flat surface and also enables the entire bottom of the base 6 to securely rest on a slightly curved surface, such as that of a key duplication machine 8 or of generally any other machine for key processing (bitting, shank grooving, incision, etc.).

The base 6 is provided with means for its mechanically stable, but removable, fixing to the machine 8. Preferably, these comprise a slot 10 provided in the front portion of the base 6 and intended to be traversed by a screw or a pin 12 for fixing to the machine 8 in a position corresponding with a threaded hole previously provided therein.

In greater detail, the shape of the base 6 and the presence of the fixing means thereon contribute to making the connection and positioning of the support 2 on the duplicating machine 8 particularly stable, such as to also withstand the vibrations produced by this latter during key processing.

Moreover, in contrast to notebooks, user interaction with the tablet computer takes place by pressing the fingers or other instruments (such as suitable pens) directly on the touch-screen. In the light of this, it is clear that the presence of said means for fixing the support 2 to the duplicating machine 8 ensures a stable connection able to withstand the forces deriving from the inevitable actions produced by the user on the screen of the table 4 positioned on the support 2.

The base 6 upperly presents a seat shaped as a cylindrical portion with its concavity facing upwards and intended to securely receive a tubular element 14. The stability of the connection between these components suitably derives from the fact that the curvature of the cylindrical portion-shaped seat of the base 6 corresponds substantially to that of the tubular element 14.

A cylindrical member 16, of substantially horizontal extension, passes through the interior of the tubular element 14 and emerges from the ends thereof as two terminal portions 18.

The support 2 also comprises first means for resting on and removably coupling to the lower edge of the tablet 4. It comprises two parallel first rods 20, each comprising a rectilinear portion inserted diametrically into the corresponding terminal portion 18 of the cylindrical member 16, and connected to the other rod by a horizontal portion 22 which is shaped as a hook or otherwise suitable for securely coupling to the lower edge of the tablet 4.

The support 2 also comprises second means, for resting on and coupling to the upper edge of a tablet 4. These comprise second rods 24 for resting on the rear of the tablet; these in their turn each comprise a rectilinear portion inserted diametrically into the corresponding terminal portion 18 of the cylindrical member 16 and are connected together by an upper portion 30, also shaped as a hook or otherwise suitable for securely coupling to the upper edge of the tablet 4.

The rods 20 of the first means and the rods 24 of the second means for resting on and coupling to the tablet 4 are disposed at an angle to each other, preferably such as to define an angle substantially greater than 90°. Moreover, both the pairs of rods 20 and 24 of said means for resting on and coupling to the tablet 4 are associated with the cylindrical member 16 such as to rotate therewith about said tubular element 14.

In greater detail, in each terminal portion 18 of the cylindrical member 16, a through hole is provided in which the second rods 24 slidingly engage. For this purpose, in each terminal portion 18 an axial seat 26 is provided for housing a first pusher 28, i.e. a plunger provided internally with a spring which urges its preferably spherical end to enter into contact with and engage by friction that portion of the second rod 24 inserted into the corresponding terminal portion 18.

The friction engagement between the sphere of each first pusher 28 and the rod 24 is suitably such as to enable this to maintain a stable position relative to the cylindrical member 16 while at the same time being able to move along its axis as the result of manual adjustment intervention by the user.

In an alternative embodiment, not represented here, the first rods 20 can also be adjustable, preferably in the same manner already described with reference to the second rods 24.

Two second pushers 32 are also provided, fixed to the base 6 and to the tubular element 14, and are operationally similar to the first pushers 28. In particular, the elastic element of each second pusher 32 urges its spherical end to elastically engage in corresponding adjacent horizontal slots 34, defined on the outer surface of the cylindrical member 16. In this manner, when the cylindrical member 16 is rotated relative to the tubular element 14, the second pushers 32 snap-engage in the subsequent slots 34, in this manner enabling the inclination of the first rods 20 and of the second rods 24 to be simultaneously adjusted relative to the base 6. In other words, this enables the inclination of the tablet 4, which is properly coupled upperly and lowerly by the horizontal portions 22 and 30 respectively, to be adjusted relative to the base 6 of the support 2.

In addition, a threaded pin 36 is provided passing through the rear of the tubular element 14 until its end engages by friction the outer surface of the cylindrical member 16, to lock its rotation relative to the tubular element and hence securely maintain a certain inclination of the tablet 4 to the base 6 of the support 2.

As can be seen from FIG. 4, the support 2 according to the invention can be applied to a key processing machine 8 even if its application surface is slightly curved, such as for example that of a traditional key duplicating machine.

In this case the bottom of the base 6 of the support 2 is entirely rested on the upper curved surface 38 of the machine 8, and is securely fixed to this latter by the screw 12 which, after passing through the slot 10 of the base 6, securely connects the support 2 to the machine 8.

Advantageously, the base 6 presents a profile 37 which projects from the lower surface of the base and is intended to engage in corresponding slots, not shown, provided in the curved surface 38 of the machine 8; this makes it easy and quick to position the support 2 on the machine 8.

The second rods 24 are then slid upwards such as to withdraw their connection portion 30 from the portion 22 connecting the first rods 20, by such an extent as to define a space sufficient for insertion of the tablet 4. Then, once the tablet 4 has been positioned by resting its lower edge on said portion 22 of the first rods 20, the second rods 24 are slid downwards until the upper portion 30 hooks onto the upper edge of the tablet.

From the aforesaid it is apparent that the support according to the invention is particularly advantageous, in that:

it can be rested against any working surface, but in particular is specifically suitable for being mounted on a key processing machine, to withstand both vibrations produced by said machine and the pressures which the user exerts on the tablet touch-screen display, it enables tablet computers of virtually any dimensions to be securely supported, it is easy and quick to adjust, it is robust, simple and of low cost.

The invention claimed is:

1. A support (2) for a tablet computer (4) comprising:
a base (6) shaped to stably rest both on flat and on curved surfaces (38);
a mechanical system (10, 12) configured to removably fix said base (6) securely to a key processing machine (8) intended to be connected to and controlled by said tablet (4);
a tubular element (14) fixed on an upper surface of said base (6);
a cylindrical member (16) housed in an interior of said tubular element (14) and rotatable relative thereto; and first members (20, 22) for resting on and coupling to a lower transverse edge of said tablet (4) and second members (24, 30) for resting on and coupling to an upper transverse edge of said tablet (4), wherein said first resting and coupling members (20, 22) and said second resting and coupling members (24, 30) are disposed at an angle to each other and are associated with said cylindrical member (16) to rotate therewith relative to said tubular element (14), and wherein a relative distance between said first resting and coupling members (20, 22) and said second resting and coupling members (24, 30) is adjustable.

2. The support as claimed in claim 1, wherein said cylindrical member (16) emerges from said tubular element (14) by both terminal portions (18) of said cylindrical member, and wherein said first resting and coupling members (20, 22) and said second resting and coupling members (24, 30) for a lower edge and, respectively, the upper edge of the tablet (4) are associated to said terminal portions.

3. The support as claimed in claim 2, wherein said first resting and coupling members comprise a pair of first shaped rods (20), said second resting and coupling members comprising a pair of second shaped rods (24).

4. The support as claimed in claim 3, wherein at least one of said pair of first rods (20) or of said pair of second rods (24) comprises rods having a rectilinear portion, inserted into a corresponding terminal portion (18) of the cylindrical member (16), and a hook-shaped terminal portion configured to hook onto a lower edge and respectively the upper edge of the tablet (4).

5. The support as claimed in claim 4, wherein the terminal hook-shaped portions of the rods (20, 24) of each pair are joined together by a portion (22, 30), which in operation is disposed in front of the tablet (4), in proximity to a corresponding horizontal edge of the tablet.

6. The support as claimed in claim 3, wherein each rod of the first pair of rods (20) or of the second pair of rods (24) comprises at least one rectilinear portion slidable with friction within a hole provided in a corresponding terminal portion (18) of the cylindrical member (16).

7. The support as claimed in claim 4, wherein each terminal portion (18) of the cylindrical member (16) comprises a pusher (28) acting elastically on the rectilinear portion of each rod of the first pair (20) or of the second pair (24) inserted into said terminal portion (18).

8. The support as claimed in claim 1, wherein said tubular element (14) comprises at least one pusher (32) acting elastically via a projecting portion thereof on parallel grooves (34) defined on an outer surface of said cylindrical member (16).

9. The support as claimed in claim 1, wherein said base (6) is curved on a bottom such as to enable it to rest securely both on said flat surfaces and on said curved surfaces.

10. The support as claimed in claim 1, wherein a bottom of said base (6) has a substantially rectangular shape having two rectilinear parallel sides and two curved sides.

11. The support as claimed in claim 9, wherein the bottom of said base (6) consists of a cylindrical surface portion.

12. The support as claimed in claim 1, wherein said mechanical system configured to removably fix said base (6) to a key processing machine (8) comprise a pin (12) adapted to pass through a slot (10) provided in said base (6) and to engage in a corresponding hole provided in said key processing machine (8).

13. The support as claimed in claim 1, wherein said base (6) comprises upperly a seat shaped as a cylindrical portion having a concavity facing upwards to securely receive said tubular element (14).

14. The support as claimed in claim 13, wherein the concavity of said seat shaped as a cylindrical portion of said base (6) corresponds to a curvature of said tubular element (14).

15. The support as claimed in claim 1, wherein said tubular element (14) comprises a device (36) locking rotation of said cylindrical member (16) relative to said tubular element.

16. The support as claimed in claim 15, wherein said device locking the rotation of said cylindrical member (16) relative to said tubular element (14) comprises a threaded pin (36) which passes through the tubular element (14) until an end of the threaded pin engages an outer surface of the cylindrical member (16).

17. The support as claimed in claim 1, wherein a bottom of the base (6) comprises a profile (37) which projects from a surface of the bottom and is configured to engage in a corresponding slot provided in said machine (8).

18. A key processing machine (8) comprising:
a containment housing; and
a support (2) removably fixed securely to an outer surface of said containment housing,
wherein the support comprises:
a base (6) shaped to stably rest both on flat and on curved surfaces (38),
a mechanical system (10, 12) configured to removably fix said base (6) securely to a key processing machine (8) intended to be connected to and controlled by a tablet (4),
a tubular element (14) fixed on an upper surface of said base (6),
a cylindrical member (16) housed in an interior of said tubular element (14) and rotatable relative thereto, and
first members (20, 22) for resting on and coupling to a lower transverse edge of said tablet (4) and second members (24, 30) for resting on and coupling to an upper transverse edge of said tablet (4),
wherein said first resting and coupling members (20, 22) and said second resting and coupling members (24, 30) are disposed at an angle to each other and are associated with said cylindrical member (16) to rotate therewith relative to said tubular element (14), and
wherein a relative distance between said first resting and coupling members (20, 22) and said second resting and coupling members (24, 30) is adjustable.

19. The machine as claimed in claim 18, wherein said support (2) is fixed in a position corresponding with a curved surface of said containment housing.

* * * * *